US012488976B2

(12) United States Patent
Lumley et al.

(10) Patent No.: US 12,488,976 B2
(45) Date of Patent: Dec. 2, 2025

(54) ATMOSPHERIC PRESSURE IONISATION SOURCE

(71) Applicant: Micromass UK Ltd, Wilmslow (GB)

(72) Inventors: Nicola Lumley, Wilmslow (GB); David Douce, Wilmslow (GB); Gareth Rhys Jones, Wilmslow (GB)

(73) Assignee: Micromass UK Limited, Wilmslow (GB)

( * ) Notice: Subject to any disclaimer, the term of this patent is extended or adjusted under 35 U.S.C. 154(b) by 468 days.

(21) Appl. No.: 17/998,009

(22) PCT Filed: May 5, 2021

(86) PCT No.: PCT/GB2021/051083
§ 371 (c)(1),
(2) Date: Nov. 4, 2022

(87) PCT Pub. No.: WO2021/224616
PCT Pub. Date: Nov. 11, 2021

(65) Prior Publication Data
US 2023/0178353 A1 Jun. 8, 2023

(30) Foreign Application Priority Data
May 5, 2020 (GB) ..................................... 2006668

(51) Int. Cl.
*H01J 49/04* (2006.01)
*H01J 49/16* (2006.01)

(52) U.S. Cl.
CPC ...... *H01J 49/0477* (2013.01); *H01J 49/0404* (2013.01); *H01J 49/168* (2013.01)

(58) Field of Classification Search
CPC .. H01J 49/0477; H01J 49/0404; H01J 49/168; H01J 49/0463; H01J 49/0431; H01J 49/04; H01J 49/16
(Continued)

(56) References Cited

U.S. PATENT DOCUMENTS

2014/0264003 A1 9/2014 Di Bussolo

FOREIGN PATENT DOCUMENTS

WO WO-2014045051 A1 * 3/2014 ........... G01N 27/622

OTHER PUBLICATIONS

Waters Corporation ("Atmospheric Solids Analysis Probe Operator's Guide Supplement, Revision H" Jan. 1, 2011) (Year: 2011).*
(Continued)

*Primary Examiner* — Michael Maskell
(74) *Attorney, Agent, or Firm* — Goodwin Procter LLP

(57) ABSTRACT

An atmospheric pressure ionisation source comprising: an ionisation chamber, comprising an inlet for receiving at least the distal end of a capillary into the ionisation chamber in use; a desolvation heater including a heating element, for directing a stream of heated gas onto the distal end of the capillary in use; a corona discharge device arranged in the ionisation chamber; and a control system configured to operate the source in a selected one of: an analytical mode, in which the heating element is heated to a first temperature within a first temperature range, and in which a first current within a first current range is supplied to the corona discharge device; and a capillary priming mode, in which the heating element is heated to a second temperature within a second temperature range, and in which a second current within a second current range is supplied to the corona discharge device, wherein the lower limit of the second temperature range is higher than the lower limit of the first temperature range, and the second current range is higher than the first current range.

20 Claims, 2 Drawing Sheets

Figure 1:
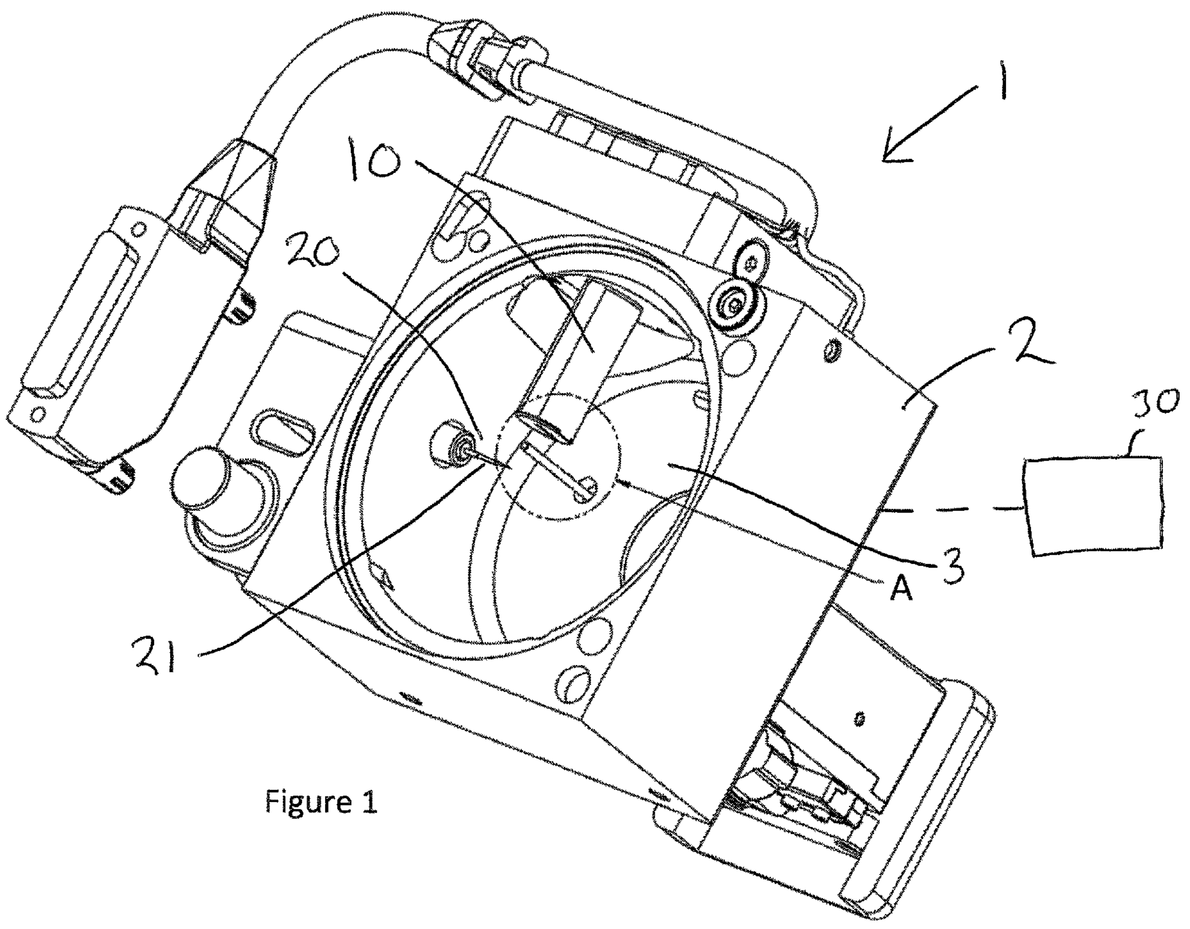

(58) Field of Classification Search
USPC .......................................... 250/281, 282, 288
See application file for complete search history.

(56) References Cited

OTHER PUBLICATIONS

International Search Report and Written Opinion for International Patent Application No. PCT/GB2021/051083, mailed Aug. 3, 2021.
Search Report for GB Patent Application No. GB2106394.6, mailed Feb. 1, 2022.
Anonymous Revision H: "Atmospheric Solids Analysis Probe Operator's Guide Supplement", Retrieved from the Internet: URL:https://www.waters.com/webassets/cms/s upport/docs/asap og supplement -revh.pdf [retrieved on Jul. 22, 2021].
McEwen, C.N., et al., "Analysis of Solids, Liquids, and Biological Tissues Using Solids Probe Introduction at Atmospheric Pressure on Commercial LC/MS Instruments", Analytical Chemistry, 77(23):7826-7831, Dec. 1, 2005.

* cited by examiner

ATMOSPHERIC PRESSURE IONISATION SOURCE

CROSS-REFERENCE TO RELATED APPLICATIONS

This application is a U.S. national phase filing claiming the benefit of and priority to International Patent Application No. PCT/GB2021/051083, filed May 5, 2021, which claims priority from and the benefit of United Kingdom Patent Application No. 2006668.4, filed May 5, 2020. The entire contents of these applications are incorporated herein by reference.

The present invention relates to an atmospheric pressure ionisation source. Particularly, the present invention relates an atmospheric pressure ionisation source selectively operable in an analytical mode and a capillary priming mode.

BACKGROUND OF THE INVENTION

The invention generally relates to an atmospheric solids analysis probe (ASAP). Such probes, and the associated instrument for use with ASAP, are provided by several manufacturers, including Waters Corporation, Milford, MA, U.S.A.

ASAP is a useful and relatively cheap tool for use in the direct analysis of volatile and semi-volatile, solid and liquid samples and may be used in the analysis of speciality chemicals, synthetic polymers, energy sources and food.

A sample is introduced into an ion source housing (e.g. an API source), in which the sample is volatilised into the gas phase using a heated gas, such as nitrogen, exiting a desolvation heater and the sample is then ionised using a corona discharge pin. The ionised sample may subsequently be analysed in a mass spectrometer.

The sample is introduced into the source by loading it onto the tip of a capillary. The capillary may comprise a conventional glass capillary. The capillary may be a solid rod, or a tube, with open ends.

Capillaries are fragile and susceptible to contamination. To ensure reliable and accurate analysis, the tip of the capillary must be inserted into the source in a repeatable manner.

To assist in the loading of a capillary into a source, it is known to provide a holder comprising a clamp mechanism which serves to retain the proximal end of the capillary (opposite the tip at the distal end which carries a sample) in the capillary holder. This may provide a user with a more robust method of handling the capillary, and may also assist in the guiding of the capillary into the source. The capillary holder, and/or the source instrument, may comprise a guide mechanism to ensure the correct alignment of the capillary as it is loaded into the source.

When the capillary is arranged in the ion source housing, the distal end of the capillary is arranged adjacent the outlet of a nozzle of the desolvation heater for directing heated gas onto the capillary.

A new, unused, capillary may contain various contaminants on the surface. If a sample is added to the capillary, and subsequently volatilised and ionised, the resulting analysis may contain errors or inaccuracies due to the existence of the contaminants.

There is a desire, therefore, to clean a capillary as much as possible prior to conducting an analysis of a sample.

At least the distal end of a capillary (on which sample is to be received) may be heated to a sufficient temperature so as to volatilise and substantially remove the majority of any contaminant(s) of appropriate volatility. This may be referred to as a 'bakeout' procedure, which serves to prime the capillary for the subsequent adding and analysis of a sample.

In the capillary priming step, the desolvation heater is configured to output a sufficiently hot stream of gas onto the capillary.

However, during sample analysis of high concentration samples (including complex matrices) or high molecular weight molecules of low volatility, chemicals volatilised from the capillary may be deposited on other components within the ionisation chamber. It has been observed that some of the contaminants may be deposited on the corona discharge device. This may then negatively affect the performance of the corona discharge device in a subsequent analysis. Additionally or alternatively, the heat in the ionisation chamber during a subsequent analysis of a sample on a capillary may cause some of the deposited contaminants on the corona discharge device to be re-volatilised, which may affect the analysis of the subsequent sample or provide a high background of ions detected by the mass spectrometer.

There is a desire to address at least one of the above mentioned problems.

Accordingly, the present invention provides an atmospheric pressure ionisation source comprising:

- an ionisation chamber, comprising an inlet for receiving at least the distal end of a capillary into the ionisation chamber in use;
- a desolvation heater including a heating element, for directing a stream of heated gas onto the distal end of the capillary in use;
- a corona discharge device arranged in the ionisation chamber; and
- a control system configured to operate the source in a selected one of:
- an analytical mode, in which the heating element is heated to a first temperature within a first temperature range, and in which a first current within a first current range is supplied to the corona discharge device; and
- a capillary priming mode, in which the heating element is heated to a second temperature within a second temperature range, and in which a second current within a second current range is supplied to the corona discharge device, wherein the lower limit of the second temperature range is higher than the lower limit of the first temperature range, and the second current range is higher than the first current range.

In at least one embodiment, the first temperature range is an analytical temperature range.

In at least one embodiment, the first temperature range is between 50° C. and 600° C.

In at least one embodiment, the first temperature is between 350° C. and 450° C.

In at least one embodiment, the upper limit of the first temperature range is substantially the same as the upper limit of the second temperature range.

In at least one embodiment, the second temperature range is configured so as to substantially clean the distal end of a capillary placed within the stream of heated gas in use.

In at least one embodiment, the upper limit of the second temperature range is the maximum temperature of the heating element.

In at least one embodiment, the second temperature range is between 550° C. and 600° C.

In at least one embodiment, the second temperature is substantially equal to the upper limit of the second temperature range.

In at least one embodiment, the first current range is an analytical current range.

In at least one embodiment, the first current range is within 2 and 4 μA.

In at least one embodiment, the first current is substantially 3 μA.

In at least one embodiment, the second current range is the maximum current deliverable to the corona discharge device.

In at least one embodiment, the second current range is 8 to 50 μA.

In at least one embodiment, in the capillary priming mode the corona discharge device is operated in a positive ionisation mode and the second current is 10 μA.

In at least one embodiment, in the capillary priming mode the corona discharge device is operated in a negative ionisation mode and the second current is 8 μA.

In at least one embodiment, the desolvation heater further comprises a gas source, and the desolvation heater is configured to direct gas from the gas source over the heating element, thereby heating the gas.

In at least one embodiment, the desolvation heater is configured to output a stream of heated gas at a first flow rate within a first flow rate range during the analytical mode; and to output a stream of heated gas at a second flow rate within a second flow rate range during the capillary priming mode.

In at least one embodiment, the first flow rate range is between 2 and 3 litres per minute.

In at least one embodiment, the second flow rate range is between 18 and 22 litres per minute.

Figure 1A:
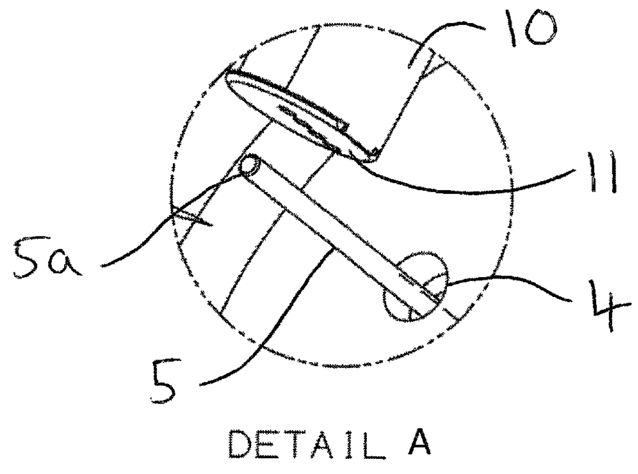
Figure 2:
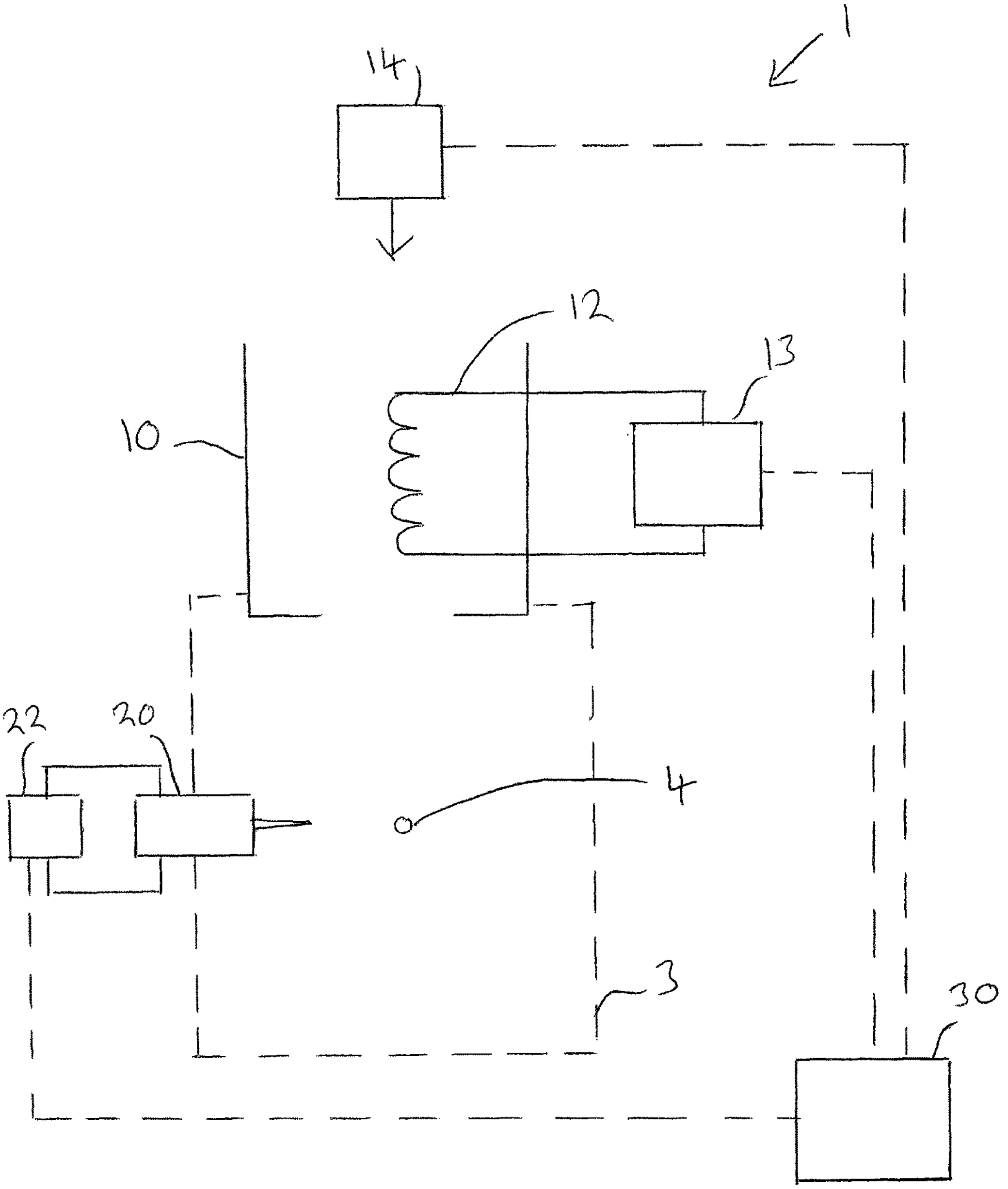

Embodiments of the present invention will now be described, by way of non-limiting example only, with reference to the figures in which:

FIGS. 1 and 1*a* illustrate an atmospheric pressure ionisation source embodying the present invention; and FIG. 2 schematically illustrates an atmospheric pressure ionisation source embodying the present invention.

FIG. 1 shows an atmospheric pressure ionisation source 1 embodying the present invention. The source 1 comprises a housing 2 which defines an ionisation chamber 3 therein. The ionisation chamber 3 comprises (best seen in FIG. 1A) an inlet 4 for receiving at least the distal end 5*a* of a capillary 5 into the chamber 3 in use.

The source 1 further comprises a desolvation heater 10. The desolvation heater 10 comprises a nozzle 11. The desolvation heater 10 comprises a heating element 12 and a gas source 14, as shown schematically in FIG. 2. A power supply 13 is connected to the heating element 12, and the supply of power to the heating element 12 causes the heating element 12 to produce heat. A gas from the gas source 14 is passed over the heating element 12 and the gas is caused to heat up and exit the nozzle 11 of the desolvation heater 10 at a temperature which is related to the temperature of the heating element 12. The temperature of the gas exiting the nozzle 11 may be less than the temperature of the heating element 12. Correspondingly, the temperature of the gas as it flows over the capillary tip 5*a* may be lower than the temperature of the gas as it exits the nozzle 11.

The desolvation heater 10 and inlet 4 are configured such that when a capillary 5 is inserted into the ionisation chamber 3, the heated gas exiting the nozzle 11 of the desolvation heater 10 serves to heat up the distal end 5*a* of the capillary, and volatilise any sample which may be provided on the distal end 5*a*.

The ionisation source 1 further comprises a corona discharge device 20 which may comprise a corona pin 21. The corona discharge device 20 serves to ionise the volatilised sample on the distal end 5*a* of the capillary 5 receivable in the ionisation chamber 3. A power supply 22 is connected to the corona discharge device 20.

The volatilised and ionised sample may then pass into the inlet cone of a mass spectrometer (not shown), to which the ionisation source is mounted in use.

As described above, before placing a sample onto the distal end 5*a* of a capillary 5, a "bakeout" procedure may first be performed, to substantially clean at least the distal end 5*a* of the capillary 5. The desolvation heater 10 is configured so as to output heated gas onto a least the distal end 5*a* of the capillary 5 to substantially heat the distal end 5*a* and to clean it.

It has, however, been noted that volatilised contaminants from sample analysis of high concentration mixtures or high boiling point compounds applied to the distal end 5*a* of the capillary 5 may be deposited on the corona discharge device 20.

The present invention provides an atmospheric pressure ionisation source 1 which comprises a control system 30 (shown schematically) which is configured to selectively operate a source 1 in an analytical mode and a capillary priming mode. Embodiments of the present invention are configured such that, in the capillary priming mode, the chances of any significant contaminants being deposited on the corona discharge device 20 are at least mitigated.

The control system 30 is configured to operate the source 1 in an analytical mode, in which the heating element 12 is heated to a first temperature within a first temperature range, and in which a first current within a first current range is supplied to the corona discharge device 20. By "analytical mode" is meant the normal mode in which the ionisation source 1 operates to conduct an analysis on a sample provided on the distal end 5*a* of the capillary 5. The first temperature range is an analytical temperature range which is selected so as to substantially volatilise any sample provided on the distal end 5*a* of the capillary 5. The first current range is configured so as to effectively ionise substantially all of the volatilised sample, which may then be passed to the inlet cone of a mass spectrometer for analysis. The control system 30 is operatively connected to one, more or all of the heating element power supply 13, the corona power supply 22 and the gas source 14 (and/or associated valve(s)). At least one thermometer may provide feedback to the control system 30.

In at least one embodiment, the first temperature range may be between 50° C. and 600° C. The control system may be configured, when operating in the analytical mode, to heat the heating element 12 to an initial temperature within the first temperature range, and then to increase the temperature over time. The increase may be substantially linear or stepped.

In at least one embodiment, the first temperature is 370-400° C. In at least one embodiment, the first temperature is substantially 380° C.

In at least one embodiment, the first temperature may be 450° C. in an isothermal targeted experiment.

In the analytical mode, the first current range is an analytical current range. In at least one embodiment, the first current range may be between 2 and 4 μA. In at least one embodiment, the first current may be substantially 3 μA.

The ionisation source 1 is further configured to selectively operate in a capillary priming mode, in which the heating element 12 is heated to a second temperature within a second temperature range. The lower limit of the second temperature range is higher than the lower limit of the first temperature range. The second temperature range may be smaller than the first temperature range. Accordingly, the difference between the upper and lower limits of the second temperature range may be smaller than the difference between the upper and lower limits of the first temperature range.

The upper limit of the first temperature range may be substantially the same as the upper limit of the second temperature range. Accordingly, that the first temperature range may encompass the second temperature range.

The upper limit of the second temperature range may be higher than the upper limit of the first temperature range.

The lower limit of the second temperature range may be higher than the upper limit of the first temperature range, such that there is no overlap, and any selected second temperature within the second temperature range is greater than any selected first temperature with the first temperature range.

The second temperature range may extend to the maximum temperature achievable by the heating element. The second temperature range may be between 550° C. and 600° C. The second temperature may be 600° C. When the distal end 5*a* of the capillary 5 is placed in the stream of heated gas exiting the nozzle 11 of the desolvation heater 10, in which the heating element 12 is heated to the second temperature, within the second temperature range, the desolvation heater 10 serves to volatilise the majority of contaminants on the distal end 5*a* of the capillary 5 likely to be volatilised at any analytical temperature (e.g. within the first temperature range)

During the capillary priming mode, a second current within a second current range is supplied to the corona discharge device 20. The second current range is higher than the first current range. By providing a higher current to the corona discharge device 20, the chances of any volatilised contaminants from the distal end 5*a* of the capillary 5 attaching to the corona discharge device 20 (for example the corona discharge pin 21) are at least reduced.

In the capillary priming mode, the second current may be the maximum current deliverable to the corona discharge device 20. In at least one embodiment, the second current range is between 8 μA and 10 μA.

The corona discharge device 20 may be configured to provide both positive and negative ionisation.

When operated in a positive ionisation mode, the second current supplied to the corona discharge device 20 may be substantially 10 μA. When the corona discharge device 20 is operated in a negative ionisation mode, the second current delivered to the corona discharge device 20 may be substantially 8 μA.

In at least one embodiment, the second current supplied to the corona discharge device 20 may be between 8 μA and 50 μA. In at least one embodiment, the second current supplied to the corona discharge device 20 may be between 8 μA and 30 μA.

The desolvation heater 10 is configured to output a stream of gas from the nozzle 11 at a flow rate. The flow rate depends on the flow rate or pressure of the gas source.

In at least one embodiment, the desolvation heater 10 of an atmospheric pressure ionisation source 1 embodying the present invention may be configured to output a stream of heated gas at a first flow rate within a first flow rate range during the analytical mode. The desolvation heater 10 may be configured to output a stream of heated gas at either an analytical (first) flow rate or a second flow rate within a second flow rate range during the capillary priming mode. The first flow rate range may be between 2 and 3 litres per minute. In at least one embodiment, the first flow rate is 2.5 litres per minute.

The second flow rate range may be between 18 and 22 litres per minute.

The delivery of a stream of heated gas at a second flow rate during the capillary primary mode, which is higher than a first flow rate of heated gas delivered during an analytical or capillary priming mode, may not be essential. Regardless of the flow rate of heated gas, the higher current (the second current) provided to the corona discharge device during the capillary priming mode may be sufficient to mitigate the depositing of any contaminants on the corona discharge device 20. Nevertheless, a higher flow rate during the capillary priming mode may help to remove any contaminants deposited on surfaces within the ionisation chamber 3.

When used in this specification and claims, the terms “comprises” and “comprising” and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. An atmospheric pressure ionisation source comprising:
an ionisation chamber, comprising an inlet for receiving at least the distal end of a capillary into the ionisation chamber in use;
a desolvation heater including a heating element, for directing a stream of heated gas onto the distal end of the capillary in use;
a corona discharge device arranged in the ionisation chamber; and
a control system configured to operate the source in a selected one of:
an analytical mode, in which the ionisation chamber is configured to receive at least the distal end of the capillary with the addition of a sample, wherein the heating element is heated to a first temperature within a first temperature range, and in which a first current within a first current range is supplied to the corona discharge device; and
a capillary priming mode, in which the ionisation chamber is configured to receive at least the distal end of the capillary prior to the addition of a sample, wherein the heating element is heated to a second temperature within a second temperature range, and in which a second current within a second current range is supplied to the corona discharge device, wherein the lower limit of the second temperature range is higher than the lower limit of the first temperature range, and the second current range is higher than the first current range.

2. An atmospheric pressure ionisation source according to claim 1, wherein the first temperature range is an analytical temperature range.

3. An atmospheric pressure ionisation source according to claim 1, wherein the first temperature range is between 50° C. and 600° C.

4. An atmospheric pressure ionisation source according to claim 1, wherein the first temperature is between 350° C. and 450° C.

5. An atmospheric pressure ionisation source according to claim 1, wherein the upper limit of the first temperature range is substantially the same as the upper limit of the second temperature range.

6. An atmospheric pressure ionisation source according to claim 1, wherein the second temperature range is configured so as to substantially clean the distal end of a capillary placed within the stream of heated gas in use.

7. An atmospheric pressure ionisation source according to claim 1, wherein the upper limit of the second temperature range is the maximum temperature of the heating element.

8. An atmospheric pressure ionisation source according to claim 1, wherein the second temperature range is between 550° C. and 600° C.

9. An atmospheric pressure ionisation source according to claim 1, wherein the second temperature is substantially equal to the upper limit of the second temperature range.

10. An atmospheric pressure ionisation source according to claim 1, wherein the first current range is an analytical current range.

11. An atmospheric pressure ionisation source according to claim 1, wherein the first current range is within 2 and 4 μA.

12. An atmospheric pressure ionisation source according to claim 11, wherein the first current is substantially 3 μA.

13. An atmospheric pressure ionisation source according to claim 1, wherein the second current range is the maximum current deliverable to the corona discharge device.

14. An atmospheric pressure ionisation source according to claim 1, wherein the second current range is 8 to 50 μA.

15. An atmospheric pressure ionisation source according to claim 14, wherein in the capillary priming mode the corona discharge device is operated in a positive ionisation mode and the second current is 10 μA.

16. An atmospheric pressure ionisation source according to claim 14, wherein in the capillary priming mode the corona discharge device is operated in a negative ionisation mode and the second current is 8 μA.

17. An atmospheric pressure ionisation source according to claim 1, wherein the desolvation heater further comprises a gas source, and the desolvation heater is configured to direct gas from the gas source over the heating element, thereby heating the gas.

18. An atmospheric pressure ionisation source according to claim 1, wherein the desolvation heater is configured to output a stream of heated gas at a first flow rate within a first flow rate range during the analytical mode; and to output a stream of heated gas at a second flow rate within a second flow rate range during the capillary priming mode.

19. An atmospheric pressure ionisation source according to claim 18, wherein the first flow rate range is between 2 and 3 litres per minute.

20. An atmospheric pressure ionisation source according to claim 18, wherein the second flow rate range is between 18 and 22 litres per minute.

* * * * *